US005802333A

United States Patent [19]
Melvin

[11] Patent Number: 5,802,333
[45] Date of Patent: Sep. 1, 1998

[54] NETWORK INTER-PRODUCT STACKING MECHANISM IN WHICH STACKED PRODUCTS APPEAR TO THE NETWORK AS A SINGLE DEVICE

[75] Inventor: Bruce W. Melvin, Roseville, Calif.

[73] Assignee: Hewlett-Packard Company, Palo Alto, Calif.

[21] Appl. No.: 785,940

[22] Filed: Jan. 22, 1997

[51] Int. Cl.⁶ .................. G06F 13/00; G06F 13/38
[52] U.S. Cl. ............................. 395/311; 395/309
[58] Field of Search ........................ 395/311, 309, 395/280, 312, 200.72; 370/420

[56] References Cited

U.S. PATENT DOCUMENTS

| 4,442,502 | 4/1984 | Friend et al. | 395/311 |
| 5,031,094 | 7/1991 | Toegel et al. | 395/311 |
| 5,239,653 | 8/1993 | Cubero-Castan et al. | 395/200.72 |
| 5,530,814 | 6/1996 | Wong et al. | 395/312 |
| 5,542,053 | 7/1996 | Bland et al. | 395/309 |
| 5,617,547 | 4/1997 | Feeney et al. | 395/311 |
| 5,659,718 | 8/1997 | Osman et al. | 395/551 |
| 5,684,966 | 11/1997 | Gafford et al. | 395/309 |
| 5,689,661 | 11/1997 | Hayashi et al. | 395/311 |
| 5,691,973 | 11/1997 | Ramstrom et al. | 395/311 |

OTHER PUBLICATIONS

PCI Local Bus Specification, Revision 2.1 Chapter 1, Introduction.
PCI Local Bus Specification, Revision 2.1 Chapter 3, Bus Operation.

Primary Examiner—Gopal C. Ray

[57] ABSTRACT

A combination of a standardized high speed switch interconnect scheme and global management makes a stack of multiple switches appear as one large managed high speed switch without impeding the transmission of information between individual switches within the managed switch, thereby providing a high speed connection between networking devices. Standard two port PCI bridges are interconnected such that an apparent three port bridge is created. This allows a transaction between systems to occur without interrupting intermediate systems. By logically connecting the PCI bus of one system to that of another, a processor in one system is allowed to access all devices in all the systems that are connected in the stack. In this way only one processor or management entity is required to configure and control a group of stacked systems.

41 Claims, 7 Drawing Sheets

Stalls all busses during
a transfer between systems

NETWORK INTER-PRODUCT STACKING MECHANISM IN WHICH STACKED PRODUCTS APPEAR TO THE NETWORK AS A SINGLE DEVICE

BACKGROUND OF THE INVENTION

1. Technical Field

The invention relates to an interconnection scheme for devices that reside on an electronic network. More particularly, the invention relates to an interconnection scheme for such devices as personal computers, bridges, routers, and network switches in an electronic network that incorporates such widely adopted protocols as that of the PCI bus, which is defined in the PCI Local Bus Specification, Revision 2.1.

2. Description of the Prior Art

Graphics-oriented operating systems, such as Microsoft's Windows and IBM's OS/2, for standard personal computer I/O architectures present a data bottleneck between the processor and its display peripherals. Moving peripheral functions with high bandwidth requirements closer to the system's processor bus can eliminate this bottleneck. Substantial performance gains are seen with graphical user interfaces (GUIs) and other high bandwidth functions (i.e. full motion video, SCSI, and LANs) when a local bus design is used.

The advantages offered by local bus designs have motivated several versions of local bus implementations. The benefits of establishing an open standard for system I/O buses have been clearly demonstrated in the personal computer industry. It is therefore important that a standard for local buses be adopted to simplify designs, reduce costs, and increase the selection of local bus components and add-in cards.

For example, the PCI Local Bus is a high performance, 32-bit or 64-bit bus having multiplexed address and data lines. The bus is intended for use as an interconnect mechanism between highly integrated peripheral controller components, peripheral add-in boards, and processor/memory systems. The PCI Local Bus Specification, Rev. 2.1, includes the protocol, electrical, mechanical, and configuration specification for PCI Local Bus components and expansion boards. The PCI Local Bus Specification defines the PCI hardware environment.

One area of concern with regard to PCI and other local buses is that of stacking. The following example explains the concept of stacking in connection with FIG. 1. Assume that a system includes a 24-port Ethernet switch 10 having two 100 Mbs ports. Also assume that there is a development team comprised of 72 developers with 72 workstations and one server. All of the workstations in this environment need to access the shared server and each other. This environment requires at least three of the above switches. If 24 users are attached to each switch via the Ethernet ports, then it is important to define how the switches are connected together and how they are connected to the server.

Ideally, the switches should be connected such that each workstation has full Ethernet bandwidth to every other workstation and to the server. For example, imagine a server having a 72-port integrated Ethernet switch. This arrangement can be approximated two ways. First, switches can be connected to each other and to a server via the 100 Mbs ports. Alternatively (as shown on FIG. 2), a 100 MBs concentrator 20 can be used in conjunction with switches 11, 12 as a top of stack switch, where the concentrator and switches are interconnected with cables 15, 16 via the 10 Mbs ports 18, 19, 21.

However, these solutions can not provide the required bandwidth. Consider the 24 users of the bottom switch 12 connected to a 100 MBs top of stack switch. The 24 full duplex, switched users correspond to a peak demand of 480 Mbs. Unfortunately, the one-100 Mbs connection to the top of stack switch 10 cannot provide the necessary bandwidth.

This bandwidth limitation could be overcome by connecting the switches together using multiple 100 Mbs links because there are two links per switch. However, two 100 Mbs ports can only provide 200 Mbs of peak bandwidth and would require complex load sharing switch software. Furthermore, this technique would rob the switch of its high speed server ports.

A high speed interconnection scheme must provide adequate bandwidth to support the necessary worst case peak load on all ports. In a system having 24-port Ethernet switches, an interconnection bandwidth of at least 480 Mbs is required. Such interconnection is possible through a shared common external bus, point-to-point bus segments, or a top of stack bus concentrator.

A single shared external bus is a half-plex bus. Only one source may transfer data on the bus at any one time. When the top switch, for example, in a system having four switches, is transferring data to the second switch in the stack, the third and fourth switches are not able to transfer data on the shared bus. Hence, these devices are stalled while waiting for the top switch to complete its transfers.

A top of stack concentrator provides the best bandwidth, but also requires a special top of stack module that can accept N connections to the N switches in the stack. Accordingly, this arrangement is only justified where performance requirements outweigh cost considerations.

A point-to-point bus shares the low cost characteristics of a shared interconnect, while maintaining the potential for concurrent data transfers, as is provided by the top of stack concentrator.

A point-to-point interconnection scheme is shown on FIG. 3. As shown, the switches 30, 31, 32 can be connected via one common high speed external backplane, or via individual segments 33, 34 connected between high speed ports 35, 36, 37, 38 of each unit, as shown in FIG. 3. This method has an advantage over the shared external backplane method of stacking in that, multiple transfers can potentially occur simultaneously between various switches in the same stack.

Consider as an example a stack of four switches. While a node on the first switch is transferring packet data to a node on the second switch, a node on the third switch can transfer packet data to the fourth switch.

The point-to-point method is electrically superior and more expandable than the shared method. In the shared method, the bus is simply extended to the next switch within the stack. With each extension of the bus, the propagation time across the bus is increased. Given that such a bus is a synchronous bus, that is clocked at a given rate, transfers across the bus must be completed by a certain interval which is a function of the clock rate. Hence, there is a point at which more switches cannot be added without violating the propagation and setup times of the bus. In addition to the added length of the bus, each additional bus connection presents an electrical disturbance that results in electrical reflections which can further degrade the quality of data transfers across the bus, thereby limiting the length of the bus or the number of switches stacked.

Thus, one goal of stacking is to provide a high speed connection between all switches in the same stack. Another potential benefit of stacking is that it allows one switch in a stack of switches to manage all the other switches in that same stack. If one switch can manage all the other switches in a given stack, then only the managing switch requires a management entity. All the other switches in the stack do not require the extra expense of adding management or an integrated processor. This assumes that the cost of stacking a switch is not more than the cost of adding a management card. This fact may or may not be true depending on the stacking scheme used. The managed switch can manage the other switches in the stack by directly accessing switching components in other switches via a high speed stacking interconnect.

Thus, one concern with local bus arrangements is the interconnection of two or more switches in such a manner that they appear to the devices connected thereto, as well as to the network, as a single switch. FIG. 4 is a block schematic diagram that shows a series of switches 40, 41, 42 that have internal bridges 45, 46, 47 and internal buses 48, 49, 50 that are configured in a PCI Local Bus arrangement. The switches are interconnected by a cable 44, such that the cable defines an external bus. When any one of the switches transmits across this external bus, none of the other switches can use the bus. Thus, this arrangement may be thought of as providing a one way street for one switch.

FIG. 5 is a block schematic diagram that shows a series of switches 51, 52 and internal busses 58, 61 that are configured in a PCI Local Bus arrangement. The switches are interconnected by cables 53, 54, 55, such that the cables each define individual segments of an external bus. Each switch incorporates two bridges 56, 57; 59, 60. Again, when one of the switches is transmitting, such transmission takes the bandwidth away from the portion of the bus that data are passing through.

It would therefore be desirable to provide a combination of a high speed switch interconnect scheme and global management that would have the effect of making a stack of multiple switches appear as one large managed high speed switch without impeding the transmission of information between individual switches within said managed switch.

SUMMARY OF THE INVENTION

The invention provides a combination of a standardized high speed switch interconnect scheme and global management that makes a stack of multiple switches appear as one large managed high speed switch without impeding the transmission of information between individual switches within said managed switch.

The herein disclosed interconnection scheme solves the problem of providing a high speed connection between networking devices. Previously this connection was provided with relatively low speed connections or via complex, non-standard, expensive, interconnection schemes. This scheme also solves the problem of managing a stack of devices. Logically connecting the bus of one PCI system to that of another allows a processor in one system to access all devices in all the PCI systems that are connected in the stack. In this way only one processor or management entity is required to configure and control a group of stacked systems.

Typically, when a transaction is performed by a master to a slave on opposite ends of a stack in a PCI system that consists of one bus or many buses connected through PCI bridges, all buses in the stack are stalled until the transaction is complete. Architecturally the herein disclosed scheme solves this problem by interconnecting standard two port PCI bridges such that the architectural equivalent of a three port bridge is created. This allows a transaction between systems to occur without interrupting intermediate systems.

The herein disclosed scheme is also electrically attractive because the PCI bus that is propagated externally between the PCI systems over a cable can be made very short. Typically, when a single two port bridge is used to separate the external backplane from the PCI system's internal backplane, the external PCI bus is propagated sequentially and continuously from system to system. This limits the allowable number of systems in the stack and the distance between systems.

DETAILED DESCRIPTION OF THE INVENTION

The invention provides a combination of a standardized high speed switch interconnect scheme and global management that makes a stack of multiple switches appear as one large managed high speed switch without impeding the transmission of information between individual switches within said managed switch. For purposes of illustrating the presently preferred embodiment of the invention, the novel interconnect scheme is herein described in connection with a PCI Local Bus. It should be appreciated that the invention is readily applicable to other interconnect schemes and is therefore not limited to the embodiment described herein.

The PCI Local Bus has been defined with the primary goal of establishing an industry standard, high performance, local bus architecture that offers low cost and that allows differentiation. While the primary focus of the PCI Local Bus scheme is on enabling desirable price-performance points in modern systems, it is important that a new standard also accommodates future system requirements and be applicable across multiple platforms and architectures.

The PCI component and add-in card interface is processor independent, enabling an efficient transition to future processor generations and use with multiple processor architectures. Processor independence allows the PCI Local Bus to be optimized for I/O functions, enables concurrent operation of the local bus with the processor/memory subsystem, and accommodates multiple high performance peripherals in addition to graphics (motion video, LAN, SCSI, FDDI, and hard disk drives).

In the PCI Local Bus standard, configuration registers are specified for PCI components and add-in cards. A system with embedded auto configuration software offers true ease-of-use for the system user by automatically configuring PCI add-in cards at power on.

Figure 1:
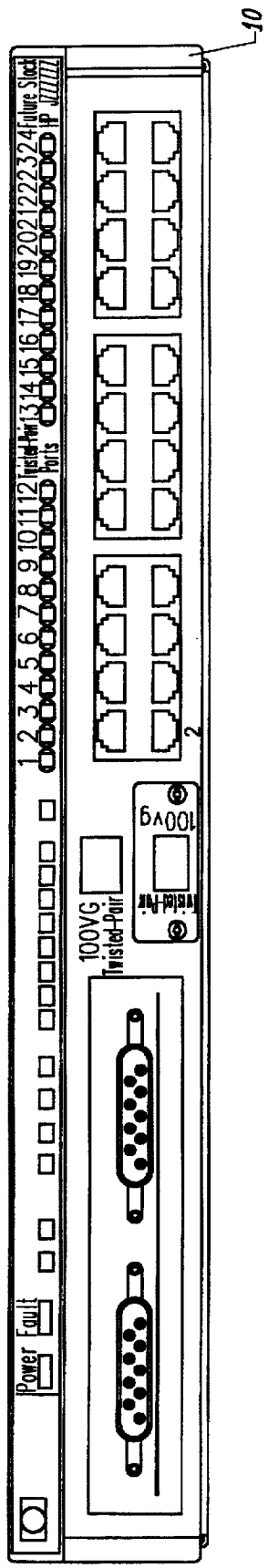
FIG. 1 is a diagram of a 24-port Ethernet switch having two 100 Mbs ports and two PCI stacking ports.
Figure 2:
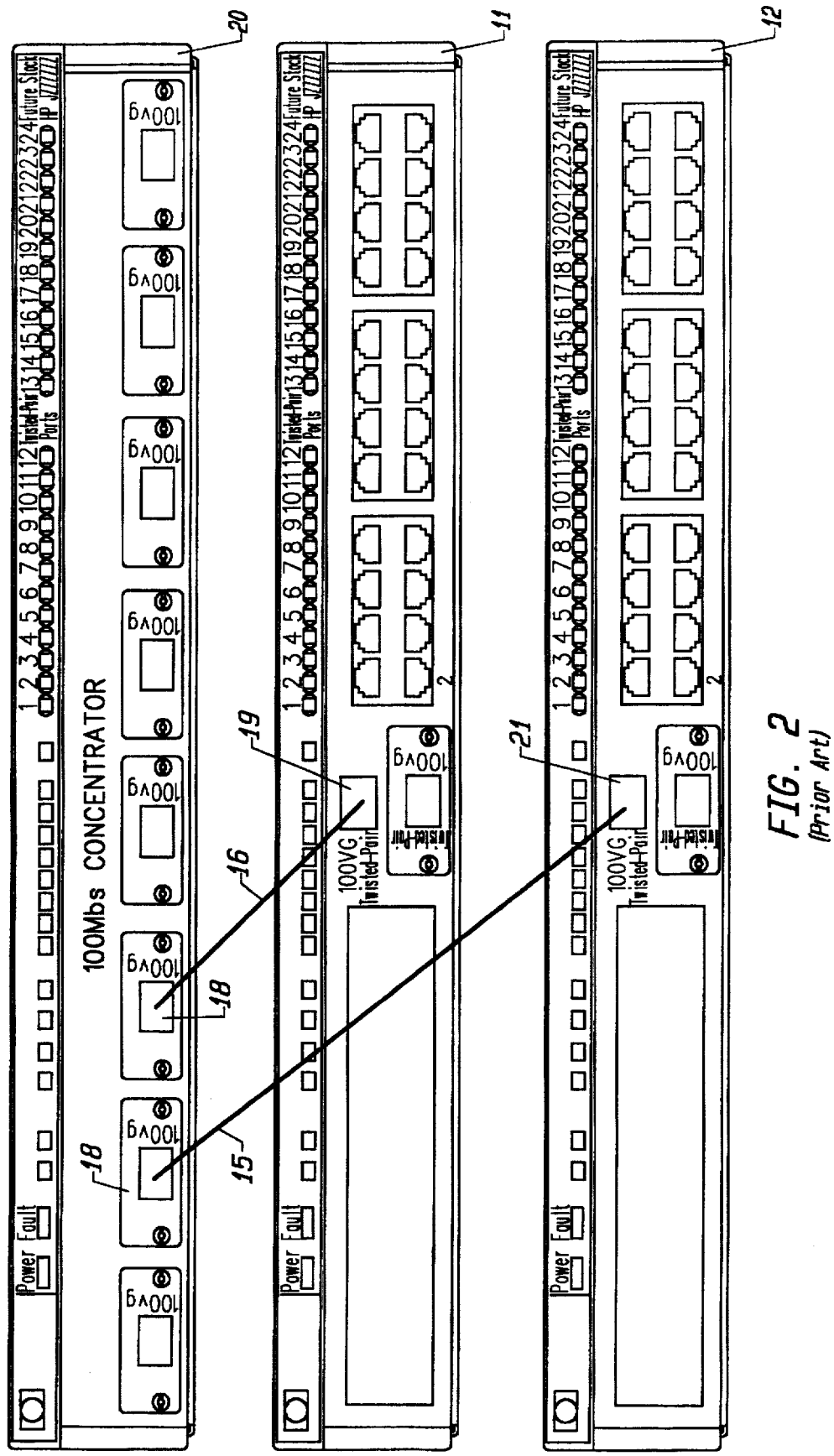
FIG. 2 is a diagram of a 100 Mbs concentrator and two 24-port switches that are interconnected via the switch's 100 Mbs ports.
Figure 3:
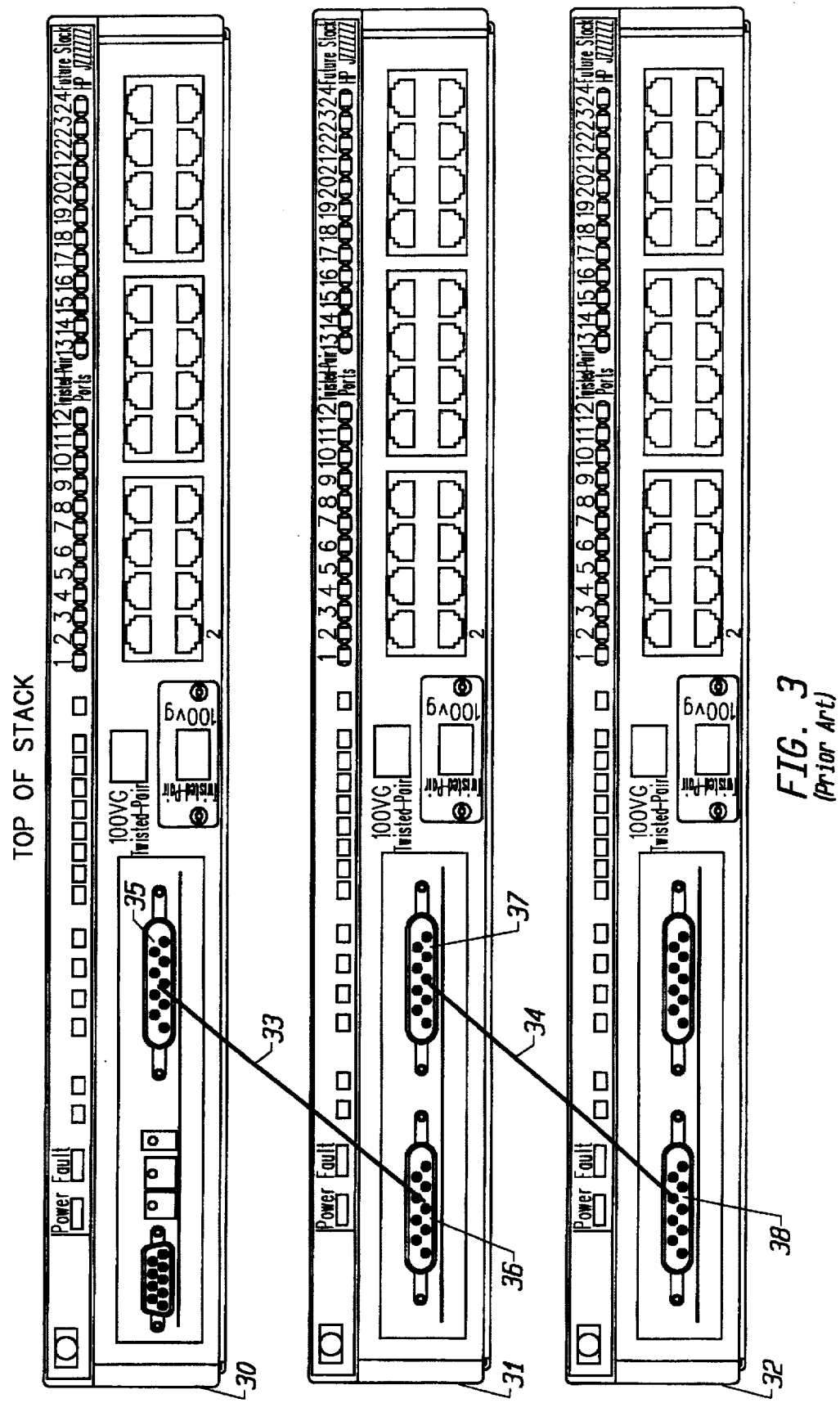
FIG. 3 is a diagram of three 24-port Ethernet switches that are interconnected via individual PCI bus segments.
Figure 4:
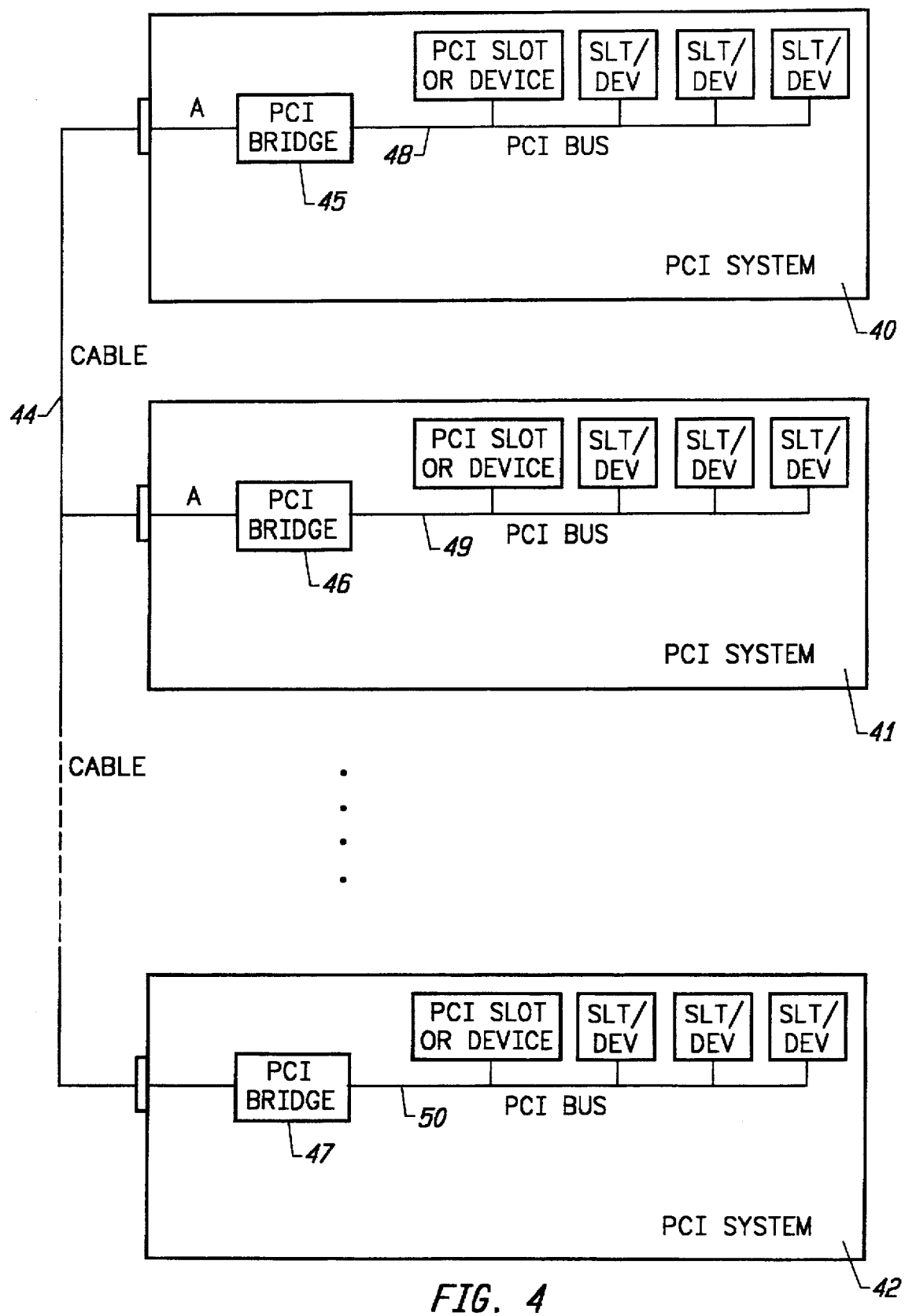
FIG. 4 is a block schematic diagram that shows a series of switches in a PCI Local Bus arrangement that are interconnected by a shared bus cable.
Figure 5:
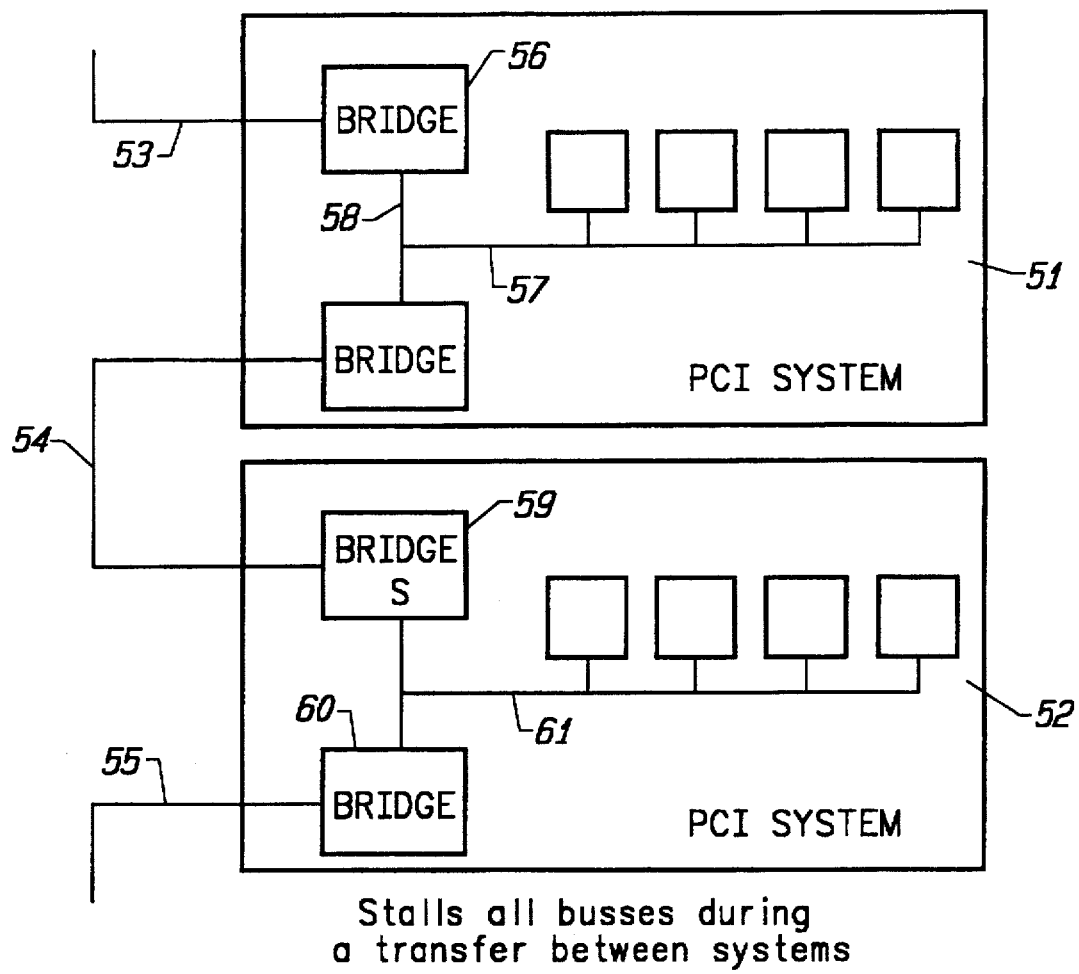
FIG. 5 is a block schematic diagram that shows a series of switches in a PCI Local Bus arrangement, where each switch incorporates two bridges according to the invention.
Figure 6:
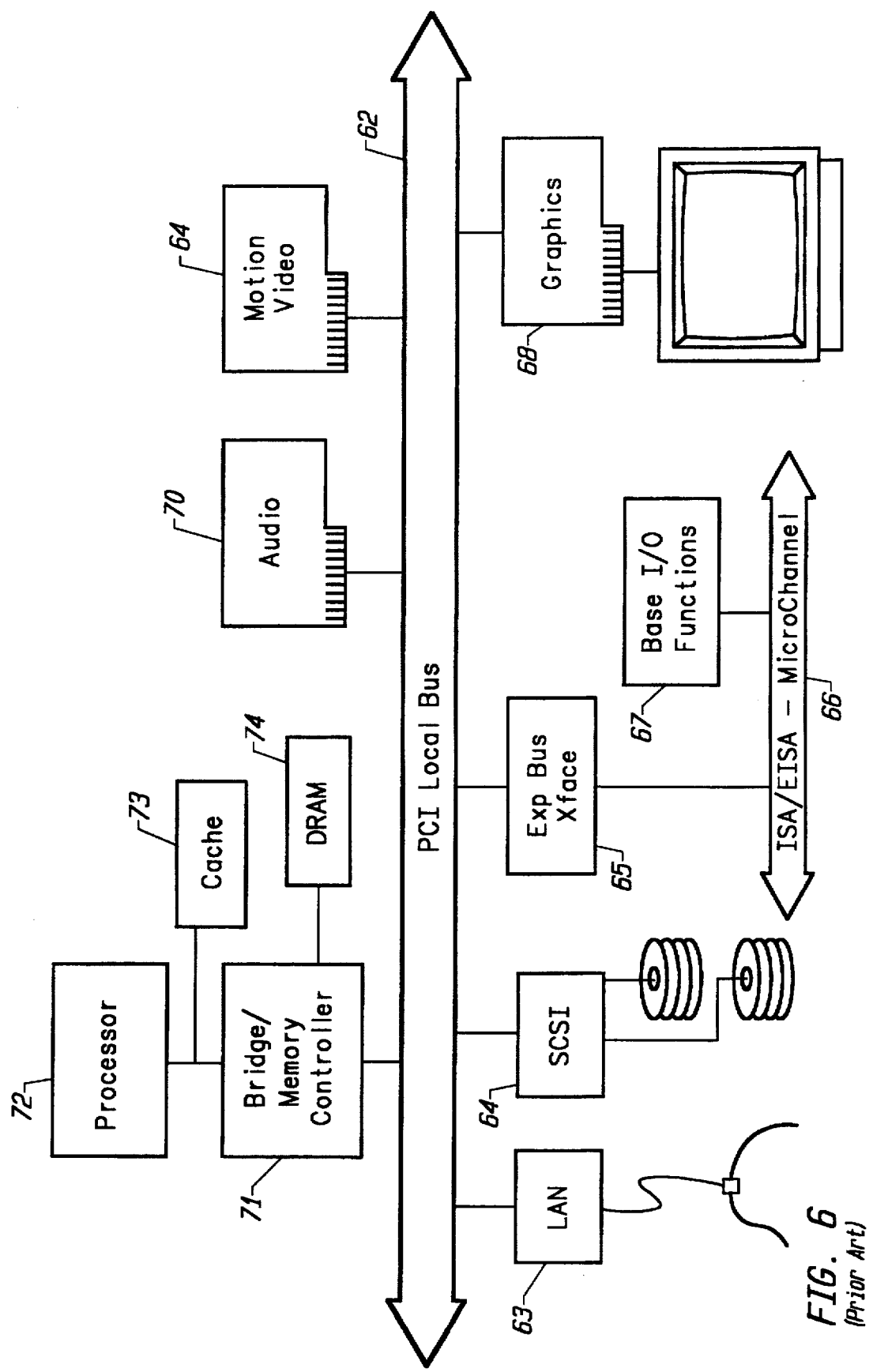
FIG. 6 is a block schematic diagram that shows a typical PCI Local Bus system architecture.

FIG. 6 is a block schematic diagram that shows a typical PCI Local Bus system architecture. This example is not intended to imply any specific architectural limits. In this example, the processor/cache/DRAM (memory) subsystem 72, 73, 74 is connected to the PCI bus 62 through a PCI bridge/memory controller 71. This bridge provides a low latency path through which the processor may directly access PCI devices mapped anywhere in the memory or I/O address spaces. It also provides a high bandwidth path allowing PCI masters to have direct access to main memory. The bridge may optionally include such functions as data buffering/posting and PCI central functions (e.g. arbitration), and may include connections to a LAN 63 or SCSI 64 connection.

Typical PCI Local Bus implementations support up to four add-in board connectors (e.g. audio 70, motion video 69, graphics 68, and the expansion bus interface 65), although expansion capability is not required. The PCI add-in board connector is a MicroChannel (MC)-style connector. The same PCI expansion board can be used in ISA-, EISA-, and MC-based systems.

The preferred embodiment of the invention is based around a switched Ethernet controller and a switched 100 Mbs controller. Both these devices are built around the PCI version 2.1 bus specification. The discussion herein is provided in connection with a high speed, 1 Gbs, 32-bit data bus, but the invention is not limited to this embodiment. The switched Ethernet controller is designed to function alone or with many other switched Ethernet controller and switched 100 Mbs controller devices.

Figure 7:
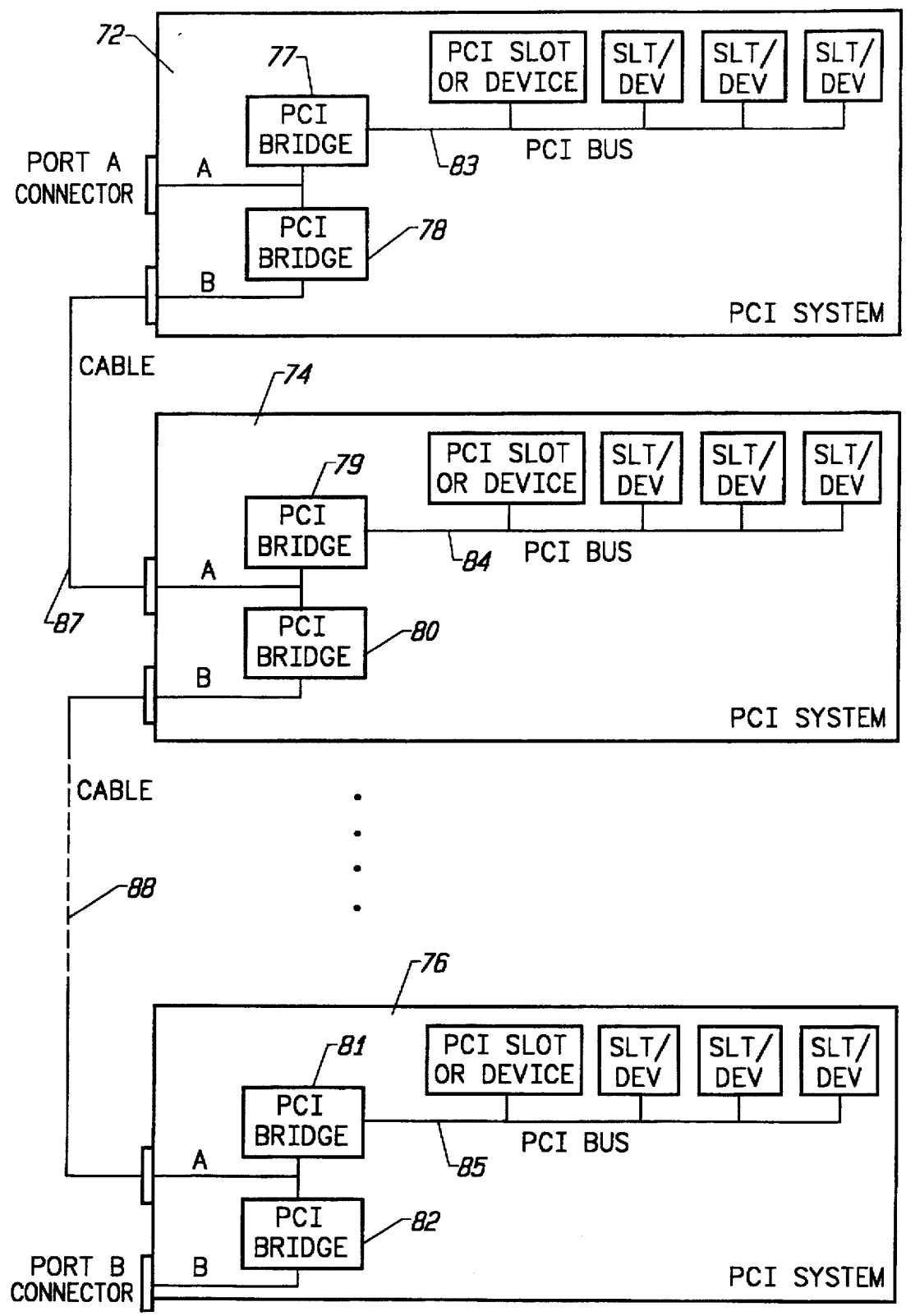
FIG. 7 is a block schematic diagram that shows a series of switches in a PCI Local bus arrangement, where each switch incorporates two bridges according to the invention.

The scheme herein described isolates the switch's local bus with a second bridge. This allows communication through any switch without affecting the switch's internal bus. FIG. 7 is a block schematic diagram that shows a series of switches 72, 74, 76 in a PCI Local bus arrangement, where each switch incorporates two bridges 77, 78; 79, 80; 81, 82, respectively, according to the invention. Each switch has an internal PCI bus 83, 84, 85 connected to one of the two bridges, i.e. bridge 77, 79, 81, and to which various PCI cards or devices may be connected. Each switch is interconnected by an external cable 87, 88.

In a typical switch, there are one or more switched Ethernet controllers and one switched 100 Mbs controller, all interconnected via the PCI bus. To connect, i.e. stack, many such switches together, it is necessary to interconnect their PCI buses. This can be accomplished with the use of PCI-to-PCI bridges. A PCI-to-PCI bridge transparently interconnects two PCI buses.

All PCI transactions are memory mapped. Switched Ethernet controllers and switched 100 Mbs controller devices must all be mapped into different address spaces. In one embodiment, a PCI bridge decodes each transaction on a given bus to determine if the access is aimed at a device across the bridge. If the bridge determines that an access is aimed at a device across the bridge, the bridge holds off the initiator and gains access to the target PCI bus. When the target device is ready to accept the transfer, it signals the bridge which (in turn) signals the initiator that the transaction may proceed. This same process can occur through many chained PCI bridges.

As discussed above, all switched Ethernet controllers are memory mapped. Each switched Ethernet controller in the preferred embodiment of the invention has the mapping indicated in Table 1 below.

TABLE 1

| Switched Ethernet Controller Mapping, PCI Address | | | |
|---|---|---|---|
| 31:27 | 26:22 | 21 | 20:0 |
| 0001 | Device Number | Internal Register (0) or DRAM (1) select bit | Varies depending on Access |

The device number of each switched Ethernet controller is set during device reset. The Device Number is assigned corresponding to the position of the device in the stack. A device at the top of the stack has a lower device number than a box at the bottom of the stack. The top of the stack box is a switch whose B port stacking connector is used to connect to the next box in the stack and has its A port unconnected. Likewise, a switch in the stack whose A port connector is used while the B port connector is unused would be the end switch in the stack. In practice, there is no A port on a top of stack switch because the A port always is at the top of a stack and cannot have another device stacked above it. Due to a limitation found in some switched Ethernet controllers, there can be only 32 devices in a given stack. There is one device for every two 100baseX ports and one device for every eight 10BaseT ports.

The PCI bus is a synchronous bus. All transactions on the bus are made relative to the PCI clock. When PCI buses are interconnected via PCI-to-PCI bridges, it is important that the two buses be synchronous with each other. As a result, when a stack of switches is formed by interconnecting the PCI buses, it is necessary to ensure that the clocks are relatively in phase with each other. Some amount of skew between the clocks is acceptable, given that an equal amount of margin is available. PCI-to-PCI bridges typically have individual clocks for both primary and secondary PCI ports. The skew between the two clocks is compensated for by the bridge itself.

When a switch is used individually, as opposed to a switch in a stack of switches, the switch generates its own internal timing. However, when a stack is formed it is necessary for one switch to become the master clock source for all other switches in the stack. All the other switches in the stack disable their internal clocks and use a form of the master clock. The clock sent to each unit is a slightly delayed version of the clock delivered to the previous switch in the stack.

When a new switch is added or removed from the stack of switches, the existing switches do not know a switch has been added or removed. Each switched Ethernet controller typically contains a 32-bit device register. Each bit of this 32-bit register corresponds to a device in the stack. Upon power-up or reset, the register defaults to all ones, indicating that all 32 possible devices are present. This 32-bit register can also be programmed by a processor.

When a generic data transfer is required to be made to all devices in the stack by a single device, such single device attempts to transfer data to every known device in the stack, as indicated by the device register. When a switch is added or removed from the stack, it becomes necessary to reassign the device numbers and adjust the device register. The device numbers can only be reordered by resetting all the devices in the stack.

The device numbers in the stack are reassigned each time any of the following occur:

A cable is attached to a downlink or "B" port;

A cable is disconnected from either an uplink or a downlink port;

A parity of system error occurs between PCI-to-PCI bridges; or

A switch in the stack loses power or fails.

The herein disclosed interconnection scheme, as mentioned above, solves the problem of providing a high speed connection between networking devices. Previously this connection was provided with relatively low speed connections or via complex, non-standard, expensive, interconnection schemes. This scheme also solves the problem of managing a stack of devices. Logically connecting the bus of one PCI system to that of another allows a processor in one system to access all devices in all the PCI systems that are connected in the stack. In this way only one processor or management entity is required configure and control a group of stacked systems.

Typically, when a transaction is performed by a master to a slave on opposite ends of a stack in a PCI system that consists of one bus or many buses connected through PCI bridges, all buses in the stack are stalled until the transaction is complete. Architecturally this scheme solves this problem by interconnecting standard two port PCI bridges such that an equivalent to a three port bridge is created. This allows a transaction between systems to occur without interrupting intermediate systems.

The herein disclosed scheme is also electrically attractive because the PCI bus that is propagated externally between the PCI systems over a cable can be made very short. Typically, when a single two port bridge is used to separate the external shared backplane from the system's internal backplane, the external shared PCI bus is propagated sequentially and continuously from system to system. This limits the allowable number of systems in the stack and the distance between systems.

Further, the herein described scheme allows concurrent accesses across a backplane (or via a stacking cable) between switches as long as the concurrently active paths do not pass through each other. That is, it is possible to provide a stack of switches labeled, for example A, B, C, D, E. Thus, switch A can transmit to switch B, at the same time that switch C transmits to switch D, and switch E transmits to switch F.

When systems are interconnected via PCI-to-PCI bridges, the bridges must first be configured before the systems can communicate via the bridges. In addition to bridge specific configuration settings, the bridges must be configured as to which range of address mapped, system accesses should be propagated through the bridge. For example, when the switch at the top of the stack wants to transfer data to a lower switch in the stack, the bridges separating the two switches must all be configured to recognize the address of the access as targeted toward the lower switch in the stack. Once configured, the bridges transparently transfer the data between the two switches. This configuration can be accomplished by a management entity at the top of the stack (e.g. an optional management stacking card that provides management for the entire stack), or via dedicated programming hardware associated with each PCI-to-PCI bridge.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An apparatus for high speed interconnection of devices on an electronic network, comprising:

a plurality of switches, wherein each switch incorporates two bridges;

an interconnect bus for interconnecting each switch via a first of said bridges; and a local bus associated with each switch, wherein said local bus is isolated from said interconnect bus via a second of said bridges;

wherein said switches are interconnected as a stack of switches that appear to said network as one switch without impeding the transmission of information between individual switches within said stack.

2. The apparatus of claim 1, wherein said first bridge allows communication through any switch without affecting said switch's local bus.

3. The apparatus of claim 1, wherein said interconnect bus further comprises:

an external cable.

4. The apparatus of claim 1, wherein said local bus is a PCI bus.

5. The apparatus of claim 1, further comprising:

a second local bus interposed between said two bridges.

6. The apparatus of claim 5, wherein said two bridges further comprise:

a PCI-to-PCI bridge that transparently interconnects said two local buses.

7. The apparatus of claim 1, wherein each of said bridges decodes each transaction to determine if access is aimed at a device across said bridge.

8. The apparatus of claim 7, wherein said bridge determines that an access is aimed at a target device across said bridge, said bridge holds off an initiator, and said bridge gains access to a local bus associated with said bridge.

9. The apparatus of claim 8, wherein said target device signals said bridges when it is ready to accept a transfer and said bridges, in turn, signal said initiator that the transaction is able to proceed.

10. The apparatus of claim 8, further comprising:

a plurality of chained bridges.

11. The apparatus of claim 1, wherein a specific device number is assigned to a given switch.

12. The apparatus of claim 11, wherein said device number is assigned corresponding to the position of the switch in said stack.

13. The apparatus of claim 1, wherein each switch in said stack uses a plurality of device numbers, a last device number used is conveyed to a next switch, said next switch assigns device numbers consecutively, starting with the last device number used in a previous switch in said stack, and said next switch sends the last device number used to a further next switch in said stack.

14. The apparatus of claim 1, wherein all transactions are relative to a system clock, and wherein all buses are synchronous with each other.

15. The apparatus of claim 14, wherein said bridges at each switch further comprise:

individual clocks for both primary and secondary ports.

16. The apparatus of claim 15, wherein skew between said individual clocks is compensated for by said bridge itself.

17. The apparatus of claim 1, wherein one switch provides a master clock source for all other switches in said stack.

18. The apparatus of claim 17, wherein all other switches in said stack disable their internal clocks and use a form of said master clock.

19. The apparatus of claim 17, wherein said clock sent to each switch is a delayed version of the clock delivered to a previous switch in said stack.

20. The apparatus of claim 1, wherein a specific device number is reassigned to a given switch when a switch is added to or removed from said stack.

21. The apparatus of claim 1, wherein a single management entity is used to configure and control a group of stacked switches.

22. The apparatus of claim 1, wherein said switches are interconnected to allow concurrent accesses between said switches.

23. The apparatus of claim 1, further comprising:
a management stacking card that provides management for the entire stack.

24. A switch for high speed interconnection of a plurality of devices on an electronic network, comprising:
at least two bridges; and
a first external connector for interconnecting one bridge of said switch to another switch via an interconnecting bus; and
a local bus associated with said switch, wherein said local bus is isolated from said first external connector via a second of said bridges;
wherein said switch is adapted for interconnection in a stack of switches that appear to said network as one switch without impeding the transmission of information between individual switches within said stack.

25. A process for high speed interconnection of devices on an electronic network, comprising the steps of:
providing a plurality of switches, wherein each switch incorporates two bridges;
providing an interconnect bus for interconnecting each switch via a first of said bridges; and
providing a local bus associated with each switch, wherein said local bus is isolated from said interconnect bus via a second of said bridges;
wherein said switches are interconnected as a stack of switches that appear to said network as one switch without impeding the transmission of information between individual switches within said stack.

26. The process of claim 25, wherein said first bridge allows communication through any switch without affecting said switch's local bus.

27. The process of claim 25, further comprising the step of:
providing a second local bus interposed between said two bridges.

28. The process of claim 27, further comprising the step of:
transparently interconnecting said two local buses.

29. The process of claim 25, further comprising the step of:
decoding each transaction at said switch to determine if access is aimed at a device across said bridge.

30. The process of claim 29, further comprising the steps of:
determining that an access is aimed at a target device across said bridge;
holding off an initiator; and
gaining access to a local bus associated with said bridge.

31. The process of claim 30, further comprising the steps of:
signaling said bridge when it is ready to accept a transfer; and
signaling said initiator that the transaction is able to proceed.

32. The process of claim 25, further comprising the step of:
assigning a specific device number to a given switching component.

33. The process of claim 32, wherein said device numbers are assigned corresponding to the position of the switch in said stack.

34. The process of claim 33, wherein a switch at the top of said stack has a lower device number than a switch at the bottom of said stack.

35. The process of claim 32, wherein each switch in said stack uses a plurality of device numbers.

36. The process of claim 35, further comprising the steps of:
conveying a last device number used to a next switch;
assigning device numbers consecutively, starting with the last device number used in a previous switch in said stack; and
sending the last device number used to a further next switch in said stack.

37. The process of claim 25, wherein all transactions are relative to a system clock, and wherein all buses are synchronous with each other.

38. The process of claim 25, further comprising the step of:
compensating for skew between individual clocks at each switch.

39. The process of claim 25, further comprising the step of:
providing a single management entity to configure and control a group of stacked switches.

40. The process of claim 25, further comprising the step of:
providing a plurality of switches that are interconnected to allow concurrent access between said switches.

41. The process of claim 25, further comprising the step of:
providing a management stacking card that provides management for the entire stack.

* * * * *